United States Patent
Tourapis et al.

(10) Patent No.: US 10,306,260 B2
(45) Date of Patent: May 28, 2019

(54) DEVICE AND METHOD FOR FAST BLOCK-MATCHING MOTION ESTIMATION IN VIDEO ENCODERS

(71) Applicant: FastVDO LLC, Melbourne, FL (US)

(72) Inventors: Alexandros Tourapis, Burbank, CA (US); Hye-Yeon Cheong, Burbank, CA (US); Pankaj Topiwala, Cocoa Beach, FL (US)

(73) Assignee: FASTVDO LLC, Melburne, FL (US)

( * ) Notice: Subject to any disclaimer, the term of this patent is extended or adjusted under 35 U.S.C. 154(b) by 0 days.

(21) Appl. No.: 15/614,033

(22) Filed: Jun. 5, 2017

(65) Prior Publication Data

US 2017/0272776 A1   Sep. 21, 2017

Related U.S. Application Data

(63) Continuation of application No. 14/513,064, filed on Oct. 13, 2014, now Pat. No. 9,674,548, which is a (Continued)

(51) Int. Cl.
*H04N 19/42* (2014.01)
*H04N 19/43* (2014.01)
(Continued)

(52) U.S. Cl.
CPC ......... *H04N 19/567* (2014.11); *H04N 19/139* (2014.11); *H04N 19/176* (2014.11);
(Continued)

(58) Field of Classification Search
None
See application file for complete search history.

(56) References Cited

U.S. PATENT DOCUMENTS

| 8,913,660 B2* | 12/2014 | Tourapis | H04N 19/56 375/240.12 |
| 9,674,548 B2* | 6/2017 | Tourapis | H04N 19/56 |
| 2008/0159400 A1* | 7/2008 | Lee | H04N 19/52 375/240.16 |

OTHER PUBLICATIONS

A.M. Tourapis, O.C. Au, & M.L. Liou, "Predictive Motion Vector Field Adaptive Search Technique (PMVFAST)—Enhancing Block Based Motion Estimation", 4310 Proc. of SPIE 883 (Dec. 2000).*
(Continued)

*Primary Examiner* — David N Werner
(74) *Attorney, Agent, or Firm* — Fenwick & West LLP

(57) ABSTRACT

A solution is provided to estimate motion vectors of a video. A multistage motion vector prediction engine is configured to estimate multiple best block-matching motion vectors for each block in each video frame of the video. For each stage of the motion vector estimation for a block of a video frame, the prediction engine selects a test vector form a predictor set of test vectors, computes a rate-distortion optimization (RDO) based metric for the selected test vector, and selects a subset of test vectors as individual best matched motion vectors based on the RDO based metric. The selected individual best matched motion vectors are compared and a total best matched motion vector is selected based on the comparison. The prediction engine selects iteratively applies one or more global matching criteria to the selected best matched motion vector to select a best matched motion vector for the block of pixels.

24 Claims, 9 Drawing Sheets

Related U.S. Application Data continuation of application No. 11/404,602, filed on Apr. 14, 2006, now Pat. No. 8,913,660.

(60) Provisional application No. 60/671,147, filed on Apr. 14, 2005.

(51) Int. Cl.
*H04N 19/52* (2014.01)
*H04N 19/53* (2014.01)
*H04N 19/56* (2014.01)
*H04N 19/139* (2014.01)
*H04N 19/176* (2014.01)
*H04N 19/513* (2014.01)
*H04N 19/527* (2014.01)
*H04N 19/533* (2014.01)
*H04N 19/567* (2014.01)
*H04N 19/147* (2014.01)

(52) U.S. Cl.
CPC ............. *H04N 19/42* (2014.11); *H04N 19/43* (2014.11); *H04N 19/513* (2014.11); *H04N 19/52* (2014.11); *H04N 19/527* (2014.11); *H04N 19/53* (2014.11); *H04N 19/533* (2014.11); *H04N 19/56* (2014.11); *H04N 19/147* (2014.11)

(56) References Cited

OTHER PUBLICATIONS

D.T. Hoang, P.M.Long, & J.S. vitter, "Efficient Cost Measures for Motion Estimation at Low Bit Rates", 8 IEEE Transactions on Circuits & Sys. for Video Tech. 488-500 (Aug. 1998).*

* cited by examiner

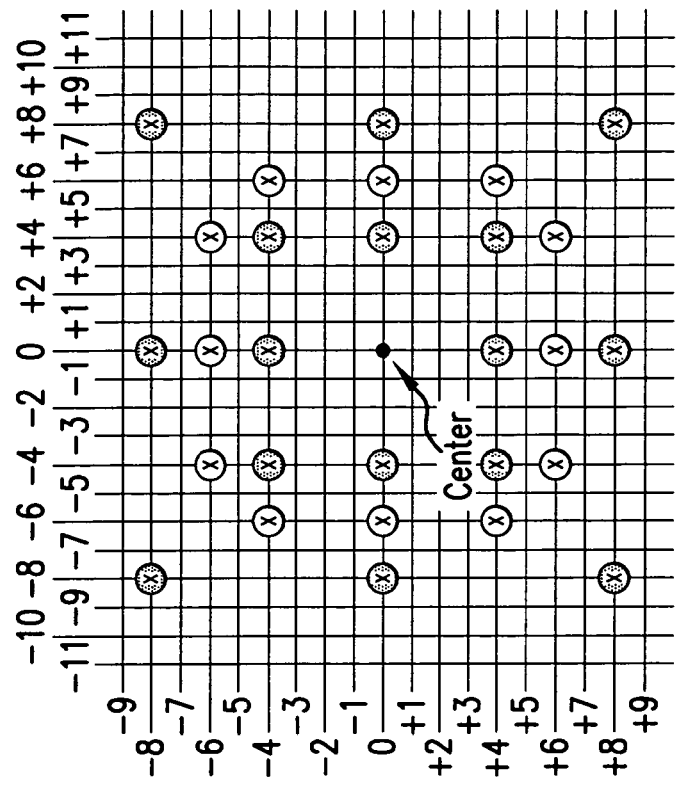
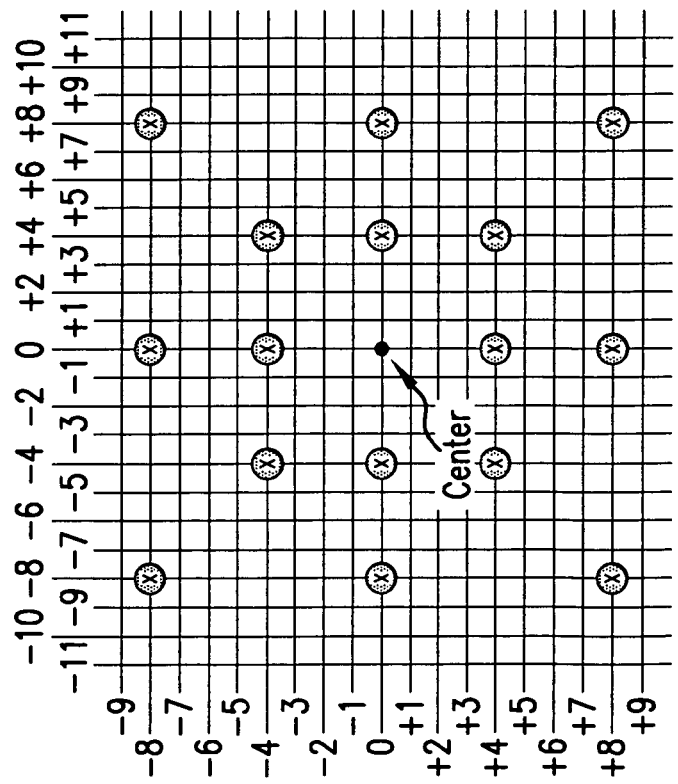

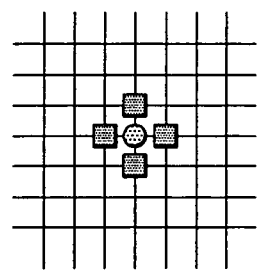
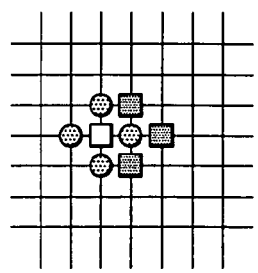
FIG.6(a)  FIG.6(b)
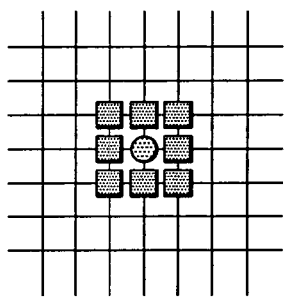
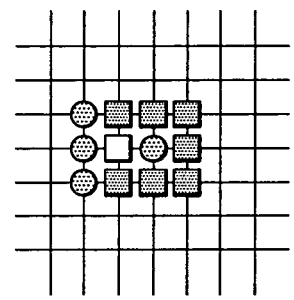
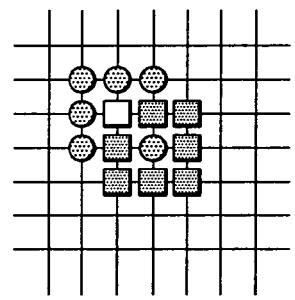
FIG.7(a)  FIG.7(b)  FIG.7(c)

DEVICE AND METHOD FOR FAST BLOCK-MATCHING MOTION ESTIMATION IN VIDEO ENCODERS

CROSS REFERENCE TO RELATED APPLICATIONS

This application is a continuation of U.S. application Ser. No. 14/513,064, filed on Oct. 13, 2014, which is a continuation of U.S. application Ser. No. 11/404,602 filed Apr. 14, 2006, now U.S. Pat. No. 8,913,660, issued on Dec. 16, 2014, which claims benefit of priority from U.S. Provisional Patent Application No. 60/671,147, filed Apr. 14, 2005, all which are incorporated by reference in their entirety.

FIELD OF THE INVENTION

The invention relates to the compression of images for storage or transmission and for subsequent reconstruction of an approximation of the original image. More particularly, it relates to the coding of video signals for compression and subsequent reconstruction. Most particularly, it relates to the use of the technique of motion estimation as a means of providing significant data compression with respect to video signals so that they may subsequently be reconstructed with minimal observable information loss.

BACKGROUND OF THE INVENTION

In general video transmission involves sending over wire, by radio signal, or otherwise very rapid successive frames of images. In the modem world, video transmission increasingly involves transmission of digital video. Each frame of a video stream is a separate image that comprises a substantial amount of data taken alone. Taken collectively, a stream of digital images making up a video represents an enormous amount of data that would tax the capacities of even the most modem transmission system. Accordingly, much effort has been devoted to compressing digital video streams by, inter alia, removing redundancies from images.

Although there are other compression techniques that can be and are used to reduce the sizes of the digital images making up a video stream, the technique of motion estimation has evolved into perhaps the most useful technique for reducing digital video streams to manageable proportions.

The basic idea of motion estimation is to look for portions of a "current" frame (during the process of coding a stream of digital video frames for transmission and the like) that are the same or nearly the same as portions of previous frames, albeit in different positions on the frame because the subject of the frame has moved. If such a block of basically redundant pixels is found in a preceding frame, the system need only transmit a code that tells the reconstruction end of the system where to find the needed pixels in a previously received frame.

Thus motion estimation is the task of finding predictive blocks of image samples (pixels) within references images (reference frames, or just references) that best match a similar-sized block of samples (pixels) in the current image (frame). It is a key component of video coding technologies, and is one of the most computationally complex processes within a video encoding system. This is especially true for an ITU-T H.264/ISO MPEG-4 AVC based encoder, considering that motion estimation may need to be performed using multiple references or block sizes. It is therefore highly desirable to consider fast motion estimation strategies so as to reduce encoding complexity while simultaneously having minimal impact on compression efficiency and quality.

Predictive motion estimation algorithms, disclosed in, for example, H. Y. Cheong, A. M. Tourapis, and P. Topiwala, "Fast Motion Estimation within the N T codec," ISO/IEC JTC1/SC29/WG11 and ITU-T Q6/SG16, document JVT-E023, October '02; H. Y. Cheong, A. M. Tourapis, "Fast motion estimation within the H.264 codec," Proc. of the Intern. Conf. on Mult. and Expo (ICME '03), Vol. 3, pp. 517-520, July '03; and A. M. Tourapis, O. C. Au, and M. L. Liou, "Highly efficient predictive zonal algorithms for fast block-matching motion estimation," IEEE Transactions on Circuits and Systems for Video Technology, Vol. 12, Iss. 10, pp. 934-47, October '02, have become quite popular in several video coding implementations and standards, such as MPEG-2, MPEG-4 ASP, H.263, and others due to their very low coding complexity and high efficiency compared to the brute force Full Search (FS) algorithm. The efficiency of these algorithms comes mainly from initially considering several highly likely predictors and from introducing very reliable early-stopping criteria.

In addition, simple yet quite efficient checking patterns have been employed to further optimize and improve the accuracy of the estimation. For example, the Predictive Motion Vector Field Adaptive Search Technique (PMV-FAST), Tourapis, Au, and Liou, cited above, initially examined a six-predictor set including the three spatially adjacent motion vectors used also within the motion vector prediction, the median predictor, (0,0), and the motion vector of the co-located block in the previous frame. It also employed adaptively calculated early stopping criteria that were based on correlations between adjacent blocks. If the minimum distortion after examining this set of predictors was lower than this threshold then the search was immediately terminated. Otherwise, an adaptive two stage diamond pattern centered on the best predictor was used to refine the search further. Due to its high efficiency (on average more than 200 times faster than FS in terms of checking points examined using search area ±16) the algorithm was also accepted within the MPEG-4 Optimization Model, "Optimization Model Version 1.0", ISO/IEC JTC1/SC29/WG 11 MPEG2000/N3324, Noordwijkerhout, Netherlands, March 2000, as a recommendation for motion estimation. The *Advanced Predictive Diamond Zonal Search* (APDZS) (Tourapis, Au, and Liou, cited above), used the same predictors and concepts on adaptive thresholding as PMVFAST, but employed a multiple stage diamond pattern mainly to avoid local distortion minima thus achieving better visual quality while having insignificant cost in terms of speed up compared to PMVFAST.

In Cheong, Tourapis, and Topiwala, cited above, the authors introduced the Enhanced Predictive Zonal Search (EPZS) algorithm which employed a simpler, single stage pattern (diamond or square). EPZS achieved better performance both in terms of encoding complexity and quality than the above mentioned algorithms, mainly due to the consideration of additional predictors and better thresholding criteria. A 3-Dimensional version of EPZS was also introduced with the main focus on multi-reference fast motion estimation such as is the case of the H.264/MPEG4 AVC standard. Considering the low complexity and high efficiency of these algorithms, it would be highly desirable to implement any such implementation within the H.264/MPEG4 AVC standard and adapt it to that standard.

The H.264/MPEG4 AVC standard, apart from the multiple reference consideration discussed above, has some additional distinctions compared to previous standards that considerably affect the performance and complexity of motion estimation. In particular, unlike standards MPEG-4 and H.263/H.263++ that only consider block types of 16×16 and 8×8, H.264 considers five additional block types, including block types of 16×8, 8×16, 8×4, 4×8, and 4×4. These must be considered within a fast motion estimation implementation in an effort to achieve best performance within an H.264 type encoder. Furthermore, considering that the current H.264 reference software (JM) implementation, JVT reference software version JM9.6, http://iphome.hhi.de/suehring/tml/download/, employs a Rate Distortion Optimization (RDO) method for both motion estimation and mode decision, it is imperative that this is also taken in account.

In particular, within the current JM software the best predictor is found by minimizing:

$$J(m, \lambda_{MOTION}) = SAD(s, c(m)) + \lambda_{Motion} * R(m-p) \quad (1)$$

with $m=(m_x, m_y)^T$ being the motion vector, $p=(p_x, p_y)^T$ p being the prediction for the motion vector, and $\lambda_{MOTION}$ being the Lagrange multiplier. The rate term $R(m-p)$ represents the motion information only and is computed by a table-lookup. The SAD (Sum of Absolute Differences) is computed as:

$$SAD(s, c(m)) = \sum_{x=1, y-1}^{B, B} |s[x, y] - c[x - m_x, y - m_y]|, \quad (2)$$

$$B = 16, 8 \text{ or } 4$$

with s being the original video signal and c being the coded video signal. A good motion estimation scheme needs to consider, if feasible, both Equation 1 and the value of $\lambda_{MOTION}$ in an effort to achieve best performance according to RD optimized encoding designs.

SUMMARY OF THE INVENTION

Motion estimation is the science of extracting redundancies in a video sequence that occur between individual frames. Given a current frame, say number n, the system divides it into a set of rectangular blocks, for example into identical blocks of size 16×16 pixels. For each such block, the system of this invention searches within the previous frame n−1 (or more generally, we search within a series of previous frames, referred to herein as references frames), to see where (if at all) it best fits, using certain measures of goodness of fit.

If it fits in the (n−1)st frame in the identical position as it is in the nth frame, then we say that the "motion vector" is zero. Otherwise, if it fits somewhere else, then there has been a displacement of that block from the (n−1)st frame to the nth frame, which is "motion." We compute the motion of the center of that block, and that is the motion vector, which we record in the compressed bitstream. In addition, having found where the current block fits in the previous frame, we subtract the current block by the best fit version in the previous frame, to obtain a block of pixels which should be nearly zero in their entries; this is called the "residual" block. This residual block is what is finally compressed and sent in the bitstream. At the other end (the decoder), this process is reversed: the decoder adds the previous block to the reconstructed residual block, giving the original block in the nth frame.

The invention herein represents a highly efficient fast motion estimation scheme for finding such redundancies in previous frames. The scheme allows for significant complexity reduction within the motion estimation process. It therefore also reduces complexity of the entire video encoder with minimal impact on compression efficiency and reconstruction quality. The invention uses adaptive consideration of efficient predictors, adaptation of patterns and thresholds, and use of additional advanced criteria. The method is applicable to different types of implementations or systems (i.e. hardware or software).

The invention, which is an extension of the Enhanced Predictive Zonal Search (EPZS), has three principal components, initial predictor selection, adaptive early termination, and final prediction refinement. Optionally the three components can be highly interdependent and correlated in that certain decisions or conclusions made in one can be made to impact the process that is performed in another.

In the predictor component, selection examines only a smaller set of highly reliable predictors, which smaller set is believed on a priori grounds to contain or be close enough to the best possible predictor. The method is then to search only the sparse subset of predictors for the motion estimation, rather than conducting full searches. In the instance method, one selects the best motion vector from the subset, and tests against an a priori criterion for early termination. If the criterion is met, motion estimation is terminated; otherwise, a second set of predictors is tested, and so on. In the end, the best motion vector from the total set is selected; see FIG. 1. The performance of motion estimation can be affected significantly by the selection of these predictors. In addition motion estimation also depends highly on the required encoding complexity, the motion type (high, low, medium) within the picture, distortion, the reference frame examined, and the current block type. Appropriate predictors are selected, e.g., by exploiting several correlations that may exist within the sequence, including temporal and spatial correlation, or can even be fixed positions within the search window.

As with motion vectors, distortion of adjacent blocks tends to be highly correlated. The early termination process uses this correlation, thereby enabling complexity reduction of the motion estimation process. If the early termination criteria are not satisfied, motion estimation is refined further by using an iterative search pattern localized at the best predictor within set S. The method disclosed herein optionally considers several possible patterns, including the patterns of PMVFAST and APDZS, Hexagonal patterns, and others. The preferred embodiments use three simple patterns. In view of the fact that equation 1 could lead to local minima (mainly due to the effect of $\lambda_{MOTION}$) that could potentially lead to relatively reduced performance, the refinement pattern is not localized only around the best predictor but, if appropriate conditions are satisfied, also repeated around the second best candidate. Optionally the process of going to successive next best candidates can be repeated until candidates are exhausted.

BRIEF DESCRIPTION OF THE DRAWINGS

FIG. 5(a) and FIG. 5(b) show two possible search-range-dependent predictor sets for search-range equal to 8.

FIG. 6(a) and FIG. 6(b) diagram the small diamond pattern used in EPZS.

FIG. 7(a), FIG. 7(b) and FIG. 7(c) represent the square/circular pattern EPZS2 used in extended EPZS.

DETAILED DESCRIPTION OF THE PREFERRED EMBODIMENTS

Figure 11:
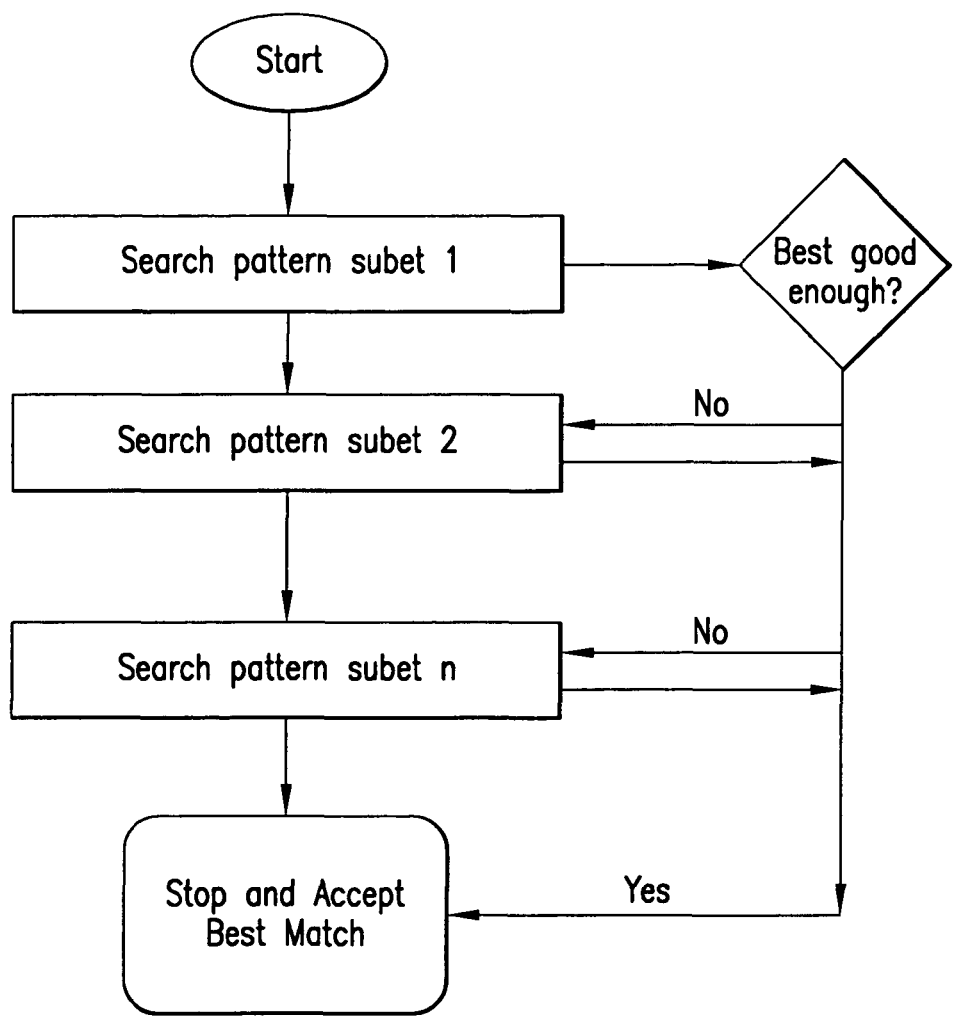
FIG. 11 is a flow diagram of the general strategy of the pattern subset method of motion estimation.

FIG. 11 is a flow diagram of the general scheme for finding redundancies between frames currently undergoing compression and prior frames. This flow diagram shows a process of searching prior frames for redundancies using patterns to be discussed below. The efficiency of the method derives from effective choice of patterns and astute choice of order of search. The method is designed for the earliest termination of a motion estimation search. The key feature of this invention is finding the best pattern subsets to search, the predictors to select given the patterns, and the order of search.

Figure 1:
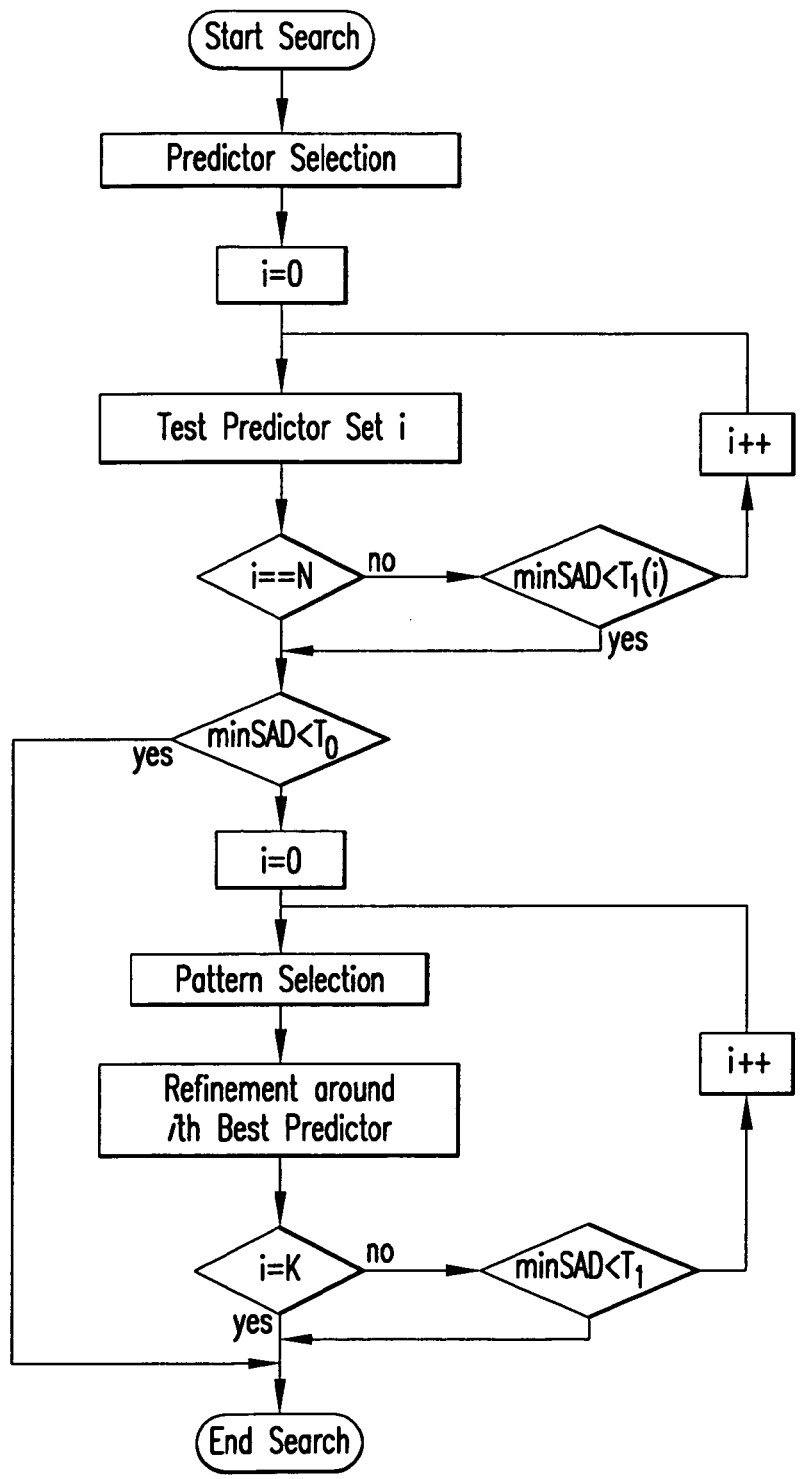
FIG. 1 contains a flowchart of the fast motion estimation process.

FIG. 1 shows an overview flow diagram of the motion vector estimation scheme of this invention. The first step 11 is Predictor Selection. In the first iterative substep 12, the system uses a Test Predictor Set selected as is explained below. The "best" set is chosen as the one that minimizes Equation 1 above to find the "best" SAD as defined in Equation 2 above. If the value of SAD is below a certain threshold $T_0$, an early termination criterion is satisfied and the process is at an end. Otherwise, the process goes on to the steps of Pattern Selection and Refinement around the n-th best Predictor.

The predictor selection component uses an adaptive predictor set. In general an adaptive predictor set S can be defined as:

$$S=\{\vec{MV_1}, \vec{MV_2}, \ldots, \vec{MV_n}\}. \quad (3)$$

The predictors in S are classified into subsets depending on their importance. The most important predictor within this set is most likely the Motion Vector Predictor (MVP), used also for Motion Vector Coding within JVT. This predictor is calculated based on a median calculation, which normally results in a motion vector for the current block with values for each element equal to the median of the motion vectors of the adjacent blocks on the left, top, and top-right (or top-left). As can also be seen from FIG. 2(a) and FIG. 2(b), this predictor tends to have a very high correlation with the current motion vector which also justifies its usage within the motion vector coding process. Since this predictor tends to be the most correlated one with the current motion vector, this median predictor is chosen as predictor subset $S_1$ (primary predictor set).

Figure 3:
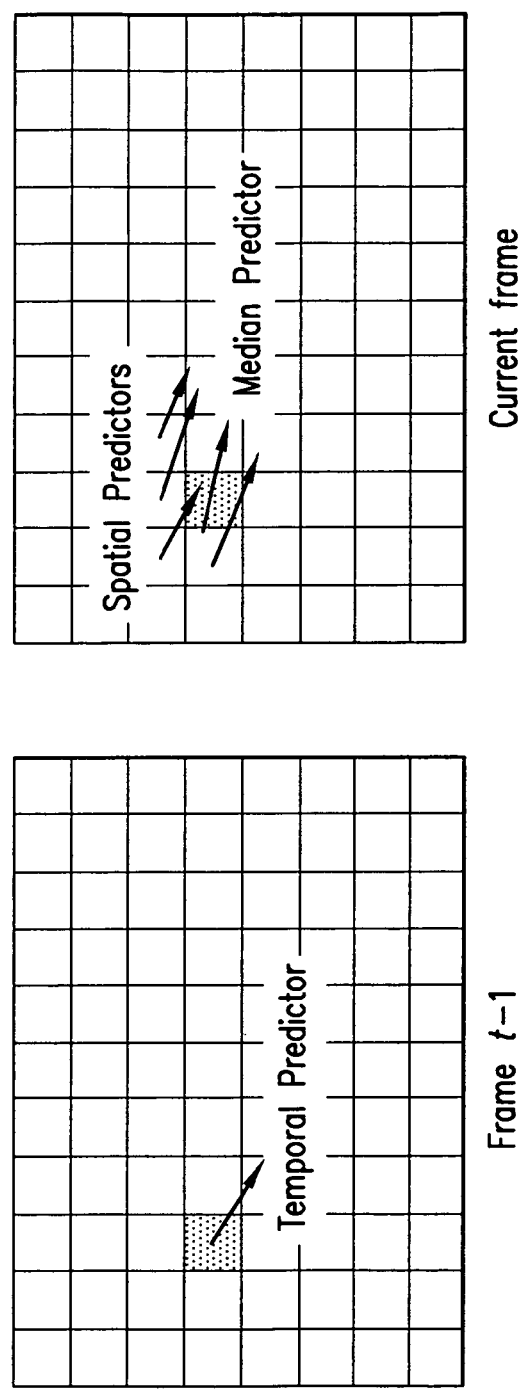
FIG. 3 portrays spatial and temporal predictors for the EPZS algorithm.
Figure 4A:
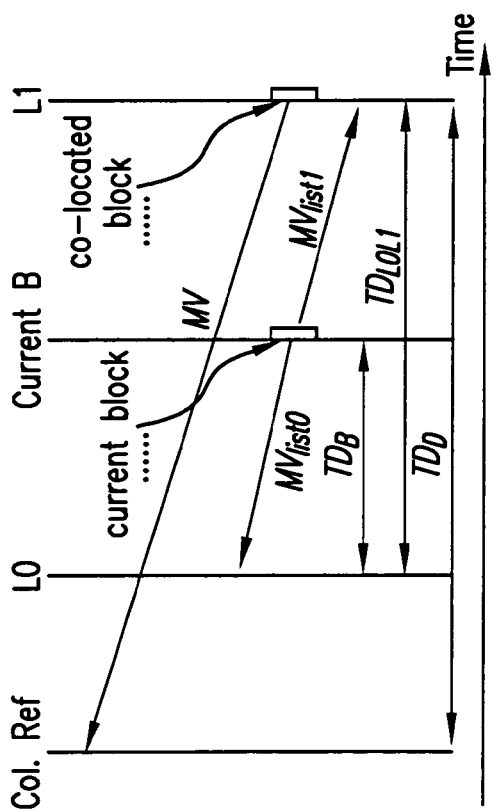
FIG. 4(a) is a schematic diagram of co-located motion vectors in B slices.
Figure 4B:
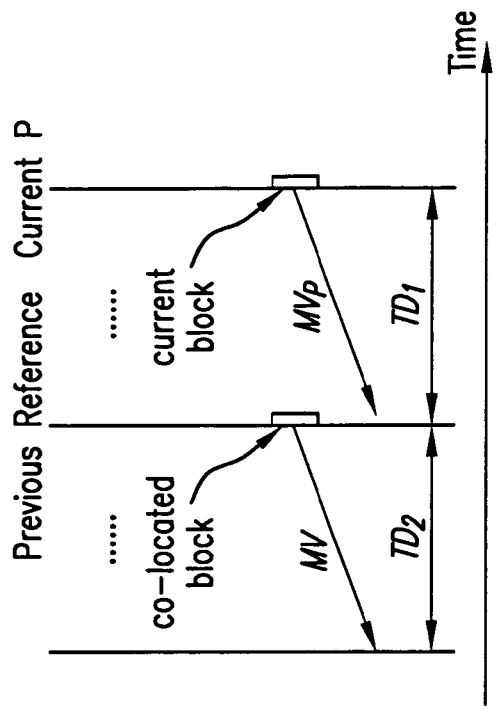
FIG. 4(b) is a schematic diagram of co-located motion vectors in P slices.
Figure 8D:
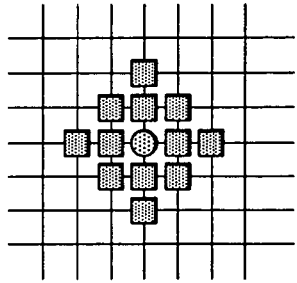
FIG. 8(a), FIG. 8(b), FIG. 8(c) and FIG. 8(d) show the extended EPSZ pattern extEPSZ.
Figure 8C:
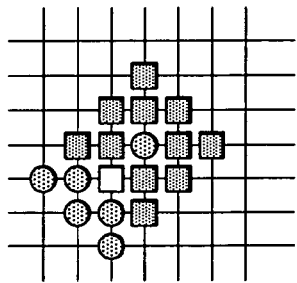

In addition, as shown in Tourapis, Au, and Liou (cited above), motion vectors in previously coded adjacent pictures and motion vectors from spatially adjacent blocks are also highly correlated with the current motion vector, as shown in FIG. 3. With respect to spatial predictors, motion vectors are usually available at the encoder and no additional memory is required. Scaling can also be easily applied to support multiple references using the temporal distances of the available reference frames. That is, the further away in number of frames a frame is from the current frame (for example, in the H.264 standard, the reference frame can be any frame, not just the previous one), the less influence it should have, and should be appropriately scaled.

However, considering that it is possible that some of these predictors may not be available (i.e., an adjacent block may have been coded as "intra," that is, coded independently without any prediction applied), the invention also optionally considers spatial prediction using predictors prior to the final mode decision to better handle such cases. These predictors require additional memory allocation. Nevertheless, only motion information for a single row of Macroblocks within a slice needs to be stored. The additional storage required is relatively negligible even for higher resolutions.

On the other hand, if memory is critical and one would still wish to use such predictors, one could store only the motion vectors for the first reference frame in each list and scale these predictors based on temporal distances for all other reference frames. Although these predictors could be problematic if a fast mode decision scheme is employed, i.e., with the implications that certain reference or block type mvs from adjacent references may not be available considering that the invention do not compute the entire motion field for all block types and references, such impact is minimized from the fact that other predictors may be sufficient enough for motion estimation purposes, or by replacing missing vectors by the closest available predictor.

Figure 2B:
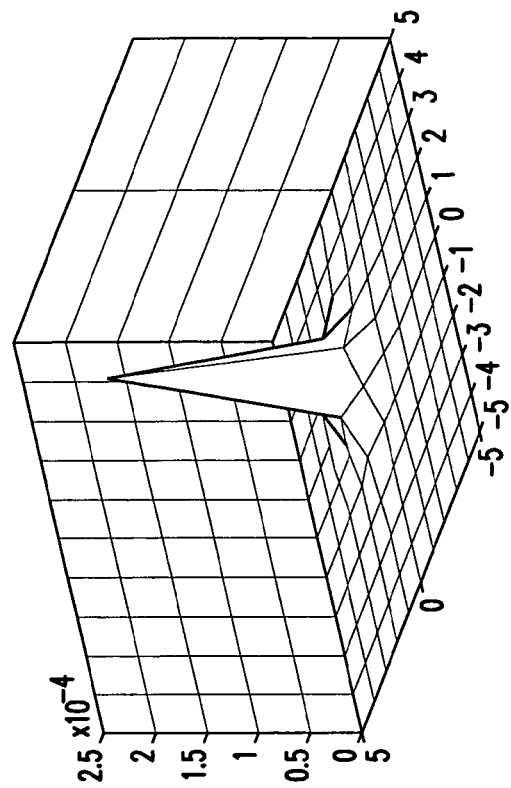
FIG. 2(a) shows the motion vector distribution in Bus and FIG. 2(b) shows the motion vector distribution in Foreman sequences versus the Median Predictor in MPEG-4.
Figure 2A:
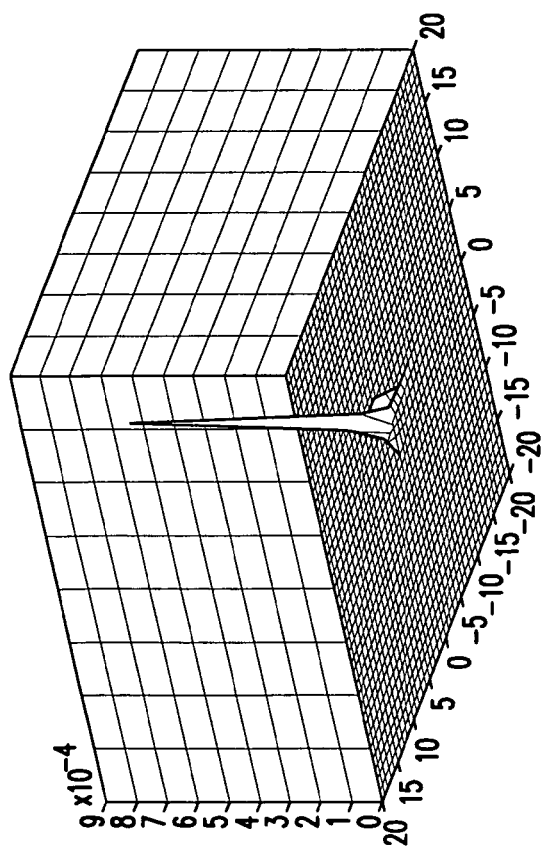

Temporal predictors, although already available since they are already stored for generating motion vectors for direct modes in B slices, have to be first processed, i.e. temporally scaled, before they are used for prediction. This process is nevertheless relatively simple but also very similar to the generation of the motion vectors for the temporal direct mode. Unlike though the scaling for temporal direct which is also only applicable to B slices (which are bi-directionally predicted, and have two lists of reference frames, called for convenience "list0" and "list1"), the invention extends this scaling to support P (or predicted) slices but also multiple references. More specifically, for B slices temporal predictors are generated by appropriately projecting and scaling the motion vectors of the first list 1 reference towards always the first list0 and list1 references, while for P slices, motion vectors from the first list 0 reference are projected to the current position and again scaled towards to the first list 0 reference As shown in FIG. 2(a) and FIG. 2(b), for B slices the co-located block's motion vector MV is scaled to generate or define the list0 and list1 motion vectors as:

$$Z_{10}=(TD_B \times 256)/TD_D$$

$$MV_{list0}=(Z_{10} \times MV+128) >> 8$$

$$Z_{11}=\{(TD_B-TD_{LOL1}) \times 256\}/TD_D$$

$$MV_{list1}=(Z_{11} \times MV+128) >> 8$$

where $TD_B$ and $TD_D$ are the temporal distances (i.e., the numbers of frames) between the current picture and its first list0 reference and of the list1 and its own reference respectively. Similarly for P slices the invention we have:

$$Z=(TD_1\times 256)/TD_2 MV_P=(Z\times MV+128)>>8$$

where now $TD_1$ and $TD_2$ are the temporal distance between the current picture and the first list0 reference, and the temporal distance between the first list0 reference and the co-located block's reference respectively. Temporal predictors are scaled always towards the zero reference since this could simplify the process of considering these predictors for all other references within the same list (i.e. through performing a simple multiplication that considers the distance relationship of these references) while also limiting the necessary memory required to store these predictors. Temporal predictors could be rather useful in the presence of large and in general consistent/continuous motion, while the generation process could be performed at the slice level. The current preferred embodiment considers nine temporal predictors, more specifically the co-located and its 8 adjacent block. These predictors could be considerably reduced by adding additional criteria based on correlation metrics, some of which are also described in Cheong, Tourapis, and Topiwala, cited above, and Tourapis, also cited above. Acceleration predictor could also be considered as an alternative predictor, although such may result in further requirements in terms of memory storage and computation.

Additional predictors could also be added by considering the motion vectors computed for the current block or partition using a different reference or block type. In our current embodiment five such predictors are considered, two that depend on reference, and three on block type. More specifically, the invention may use as predictors for searching within reference ref_idx the temporally scaled motion vectors found when searching reference 0 and ref_idx−1. Similarly, when testing a given block type the invention may consider the motion vectors computed for its parent block type but also those of block type 16×16 and 8×8. Conditioning of these predictors could be applied based on distortion and reliability of motion candidates.

As in Cheong, Tourapis, and Topiwala, cited above, in our scheme the invention also considers optional search range dependent predictor sets. See FIG. 5(a) and FIG. 5(b). These sets can be adaptively adjusted depending on different conditions of the current or adjacent blocks/partitions, but also encoding complexity requirements (i.e. if a certain limit on complexity has been reached no such predictors would be used, or a less aggressive set would be selected instead). Reduction of these predictors could also be achieved through generation of predictors using Hierarchical Motion estimation strategies, or/and by considering predictors that may have been generated within a prior preprocessing element (i.e. a module used for prefiltering or analyzing the original video source). A simple consideration would be to consider as predictors the positions at the corners and edge centers of a square pattern that is at a horizontal and vertical distance of $4\times 2^N$ with N=0 . . . ($\log_2$(search_range)−2) from a center (i.e. zero or as in our case the median predictor) as can be seen in FIG. 5(a). An alternative would be the consideration of a more aggressive pattern which also adds 9 more predictors at intermediate positions (FIG. 5(b)). Such decision would be determined depending on neighborhood mv assignments or other characteristics of the current block type determined through a pre-analysis stage. For example, the more aggressive pattern could be used if 2 or more of the spatial neighbors were intra coded. Other patterns could also be considered, such as patterns based on diamond or circular allocation, directional allocation based on motion direction probability etc. The center of these predictors could also be dynamically adjusted by for example first testing all other predictors (using full distortion or other metrics) and selecting the best one from that initial set as the center for this pattern. These predictors can also be switched based on slice type, block type and reference indicator. It should be pointed out that although such predictors can be added in random or in a raster scan order, a much better approach of adding them is to use a spiral approach where predictors are added based on their distance from the center.

In general, predictors are added and considered sequentially without any special consideration with regards to their actual values. However, in some cases the actual testing order of these predictors leads to better performance. More specifically, predictors may be added in a sorted list, i.e., sorted based on distance (e.g., Euclidean distance) from the median predictor and direction, while at the same time removing duplicates from the predictor list. Doing so can improve data access (due to data caching), but would also reduce branching since the presence of duplicate predictors need not be tested during the actual distortion computation phase. Furthermore, speed also improves for implementations where one may consider partial distortion computation for early termination, since it is more likely that the best candidate has already been established within the initial/closest to the median predictors. Triangle inequalities (i.e. equations of the form)

$$\sum_{block}|S_k - S_{k-1}| \geq \left|\sum_{block} S_k - S_{k-1}\right| = \left|\sum_{block} S_k - S_{k-1}\right|$$

may also be employed on these initial predictor candidates to reduce the initial candidate set considerably at however a lower cost than computing full distortion.

Although predictor consideration can be quite critical in terms of the quality of the motion estimation, such can also considerably in terms of complexity. Therefore the invention can add an additional constrain in terms of the number of predictors that are considered, either at the block type, Macroblock, Group of Block, or Slice/Frame level. More specifically, the invention can limit the maximum number of predictors tested for a macroblock to $N_{maxPred}$, or limit the total number of predictors tested for K blocks to $M_{maxKPred}$. In that particular case the invention can initially allocate $$\frac{M_{maxKpred}}{K}$$

predictors for each block. However, this number is updated for every subsequent block L, to $$\frac{M_{maxKpred} - \sum_{i=1}^{L} num\_pred_i}{K - L}$$

where $num\_pred_i$ is the number of predictors used for a prior block i. A certain tolerance could also be allowed in terms of the maximum allowance for a block, while the allowance could also be adjusted depending on reference index or block type.

As is the case with motion vectors, distortion of adjacent blocks tends to be highly correlated. Based on this correlation, the current invention uses an early termination process that enables substantial reduction in complexity of the motion estimation process.

After examining predictor set $S_1$ (median predictor) and calculating its distortion according to Equation 1, if this value is smaller than a threshold $T_1$ the invention may terminate the motion estimation process immediately without having to examine any other predictors. In this case the median predictor is selected as the final integer motion vector for this block type. For example, this threshold may be set equal to the number of pixels of the examined block type, although a different (larger or smaller) value could also be used and $\lambda_{MOTION}$ could be considered. This number could also have a relation with the temporal distance of the reference frame examined (i.e. by adding a small weight that depends on the distance of each reference frame).

If $T_1$ is not satisfied, then all other predictor sets have to be examined and their distortion is calculated according to equation 1. The minimum distortion at this point is compared versus a second threshold $T_2$. If it is smaller than $T_2$ the search again terminates. $T_2$ can be adaptively calculated according to:

$$T_2 = \alpha \times \min(\text{Min}J_1, \text{Min}J_2, \ldots, \text{Min}J_n) + b, \quad (4)$$

Where a and b can be fixed values and $\text{Min}J_1$, $\text{Min}J_2$, ... $\text{Min}J_n$ correspond to the minimum distortion values of the threshold predictors according to equation 1 for the current block type. the invention have found that it is sufficient to use the 3 spatially adjacent blocks (left, top, top-right) and the co-located block in the previous frame as predictors for $T_2$. Furthermore, to reduce the possibility of erroneous and inadequate early termination the invention also introduce a limit within the calculation of $T_2$, by also considering an additional fixed distortion predictor $\text{Min}J_i$ within the above calculation which is set equal to:

$$\text{Min}J_i = 3 \times 2^{bitdepth-8} \times Np, \quad (5)$$

Where Np is the number of pixels of the current block type and bitdepth corresponds to the current color bit-depth of the content encoded. This value could again be larger or smaller depending on whether the invention wants to increase speed further. The reference frame, quantizer, and temporal distance could also be considered within the calculation of $T_2$. Additional thresholding can be performed also between different block types. This though could be quite beneficial in terms of speed up since thresholding could be applied even prior to considering a block type (i.e. if the block type just examined is considered as sufficient enough). This could lead in avoiding the considerable overhead the generation of the motion vector predictors and the thresholding criteria would require for smaller block types. Similar to the spatial motion vector case, and if the invention omit the distortion of the co-located, only one macroblock row of distortion data needs to be stored therefore having relatively small impact in memory storage. Note that in some situations thresholding may be undesirable (introduces branching) and could even be completely removed, while in other situations the invention may wish to make it more aggressive (i.e. to satisfy a certain complexity constraint). Thresholding could also consider an adjustment based on Quantizer changes, spatial block characteristics and correlation (i.e. edge information, variance or mean of current block and its neighbors etc) and the invention would suggest someone interested on the topic of motion estimation to experiment with such considerations. Thresholding could also be considered after the testing of each checked position and could allow termination at any point, or even adjustment of the number of predictors that are to be tested.

The next feature of the invention to be considered is motion vector refinement. This includes the sub-steps of Pattern Selection and Refinement around the ith Best Predictor shown in FIG. 1. If the early termination criterion (step xx) are not satisfied, motion estimation is refined further by using an iterative search pattern localized at the best predictor within set S. The scheme of the current invention selects from several possible patterns, including the patterns of PMVFAST and APDZS, hexagonal patterns, and so on. However, three simple patterns are part of the preferred embodiment of this invention. In addition, due to the possible existence of local minima in Equation 1 (mainly due to the effect of $\lambda_{MOTION}$) that may lead to reduced performance, the refinement pattern is not only localized around the best predictor but under appropriate conditions also repeated around the second best candidate. Optionally such refinement can also be performed multiple times around the N-th best candidates.

The small diamond pattern, also partly exploited by PMVFAST, is possibly the simplest pattern that the invention may use within the EPZS algorithm (see FIG. 5(a) and FIG. 5(b)). The distortion for each of the 4 vertical and horizontal checking points around the best predictor is computed and compared to the distortion of the best predictor ($\text{Min}J_p$). If any of them is smaller than $\text{Min}J_p$ then, the position with the smallest distortion is selected as the new best predictor. $\text{Min}J_p$ is also updated with the minimum distortion value, and the diamond pattern is repeated around the new best predictor (FIG. 6(b)). Due to its small coverage, it is possible that for relatively complicated sequences this pattern is trapped again at a local minima. To avoid such cases and enhance performance further, two alternative patterns with better coverage are also introduced. The square pattern of $EPZS^2$ (EPZS square) which is shown in FIG. 7(a), FIG. 7(b) and FIG. 7(c) and the extended EPZS (extEPZS) pattern (FIG. 8(a), FIG. 8(b), FIG. 8(c) and FIG. 8(d)).

The search using these patterns is very similar to that with the simpler diamond EPZS pattern. It is quite obvious that in terms of complexity the small diamond EPZS pattern is the simplest and least demanding, whereas extEPZS is the most complicated but also the most efficient among the three in terms of output visual quality. All three patterns, but also any other pattern the invention may wish to employ, can reuse the exact same algorithmic structure and implementation. Due to this property, additional criteria could be used to select between these patterns at the block level. For example, the invention may consider the motion vectors of the surrounding blocks to perform a selection of the pattern used, such as if all three surrounding blocks have similar motion vectors, or are very close to the zero motion vector, then it is very likely that the current block will be found also very likely within the same neighborhood. In that case, the smaller diamond or square may be sufficient. The current distortion could also be considered as well to determine whether the small diamond is sufficient as compared to the square pattern.

Figure 9B:
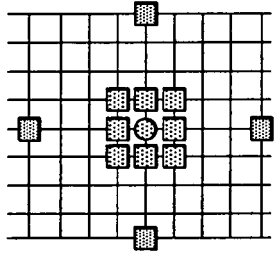
FIG. 9(a) contains example refinement patterns with subpixel position support (diamond) and FIG. 9(b) contains example refinement patterns with subpixel position support (square).
Figure 8B:
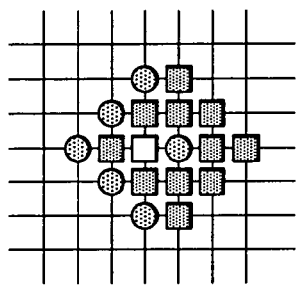
Figure 9A:
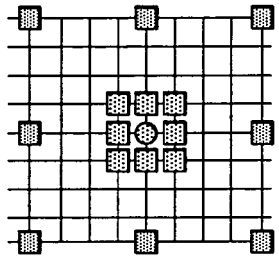
Figure 8A:
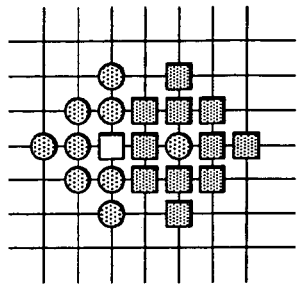

The approach of the current invention can easily employ other patterns such as the large diamond, hexagonal, or alternating direction hexagonal patterns, cross pattern etc, or other similar refinement patterns. Our scheme can also consider several other switch-able or adaptive patterns (such as PMVFAST, APDZS, CZS etc) as was also presented in 0, while it can even consider joint integer/subpel refinement (FIG. 9(a) and FIG. 9(b)) for advanced performance.

To reduce the local minima effect discussed above, a second (or multi-point) refinement process is also used in this invention. The second or multi-point refinement is performed around the second, third . . . N-th best candidate. Any of the previously mentioned EPZS patterns could be used for this refinement (i.e. combination of the extEPZS and EPZS$^2$ patterns around the best predictor and the second best respectively). It is obvious that such refinement needs not take place if the best predictor and the second best are close to one another (i.e. within a distance of k pixels).

Figure 10:
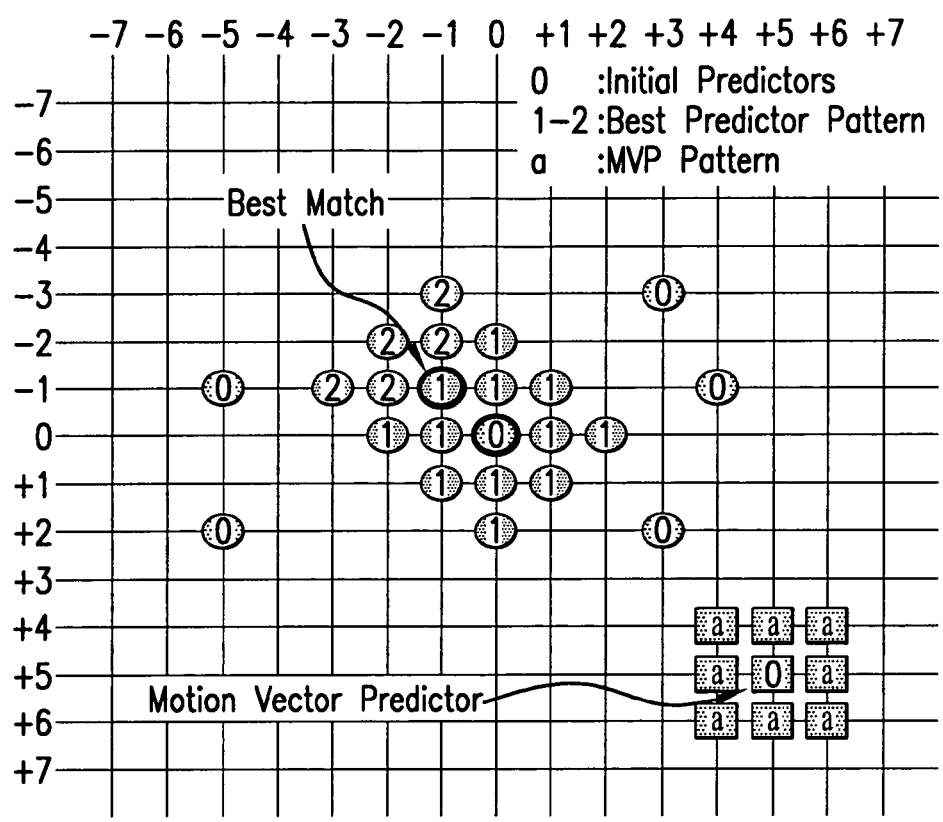
FIG. 10 sets forth an example of the Dual Pattern for EPZS using Extended EPZS for the best predictor and EPZS2 is used for the MVP.

Furthermore, even though not mandatory, early termination could be used (i.e. minimum distortion up to now versus $T_3=T_2$) while this step could be switched based on reference and block type. An example of this dual pattern is also shown in FIG. 10. In the case that N-th best candidates are considered, the number N may be adaptive based on spatial and temporal conditions.

Other optional embodiments are available in this invention. In many systems, motion estimation is rather interleaved with the mode decision and coding process of a MB. For example, the H.264 reference software performs motion estimation at a joint level with mode decision and macroblock coding in an attempt to optimize motion vectors in an RD sense. However, this introduces considerable complexity overhead (i.e. due to function/process calls, inefficient utilization of memory, re-computation of common data etc) and might not be appropriate for many video codec implementations. Furthermore, this process does not always lead to the best possible motion vectors especially since there is no knowledge about motion and texture from not already coded macroblocks/partitions.

To resolve these issues the invention introduces an additional picture level motion estimation step which computes an initial motion vector field using a fixed block size of N×M (i.e. 8×8). Motion estimation could be performed for all references, or be restricted to the reference with index zero. In this phase all of the previously defined predictors may be considered, while estimation may even be performed using original images. However, an additional refinement process still needs to be performed at the macroblock/block level, although at this step the invention may now consider a considerably reduced predictor set and therefore reduce complexity.

More specifically, the invention may now completely remove all temporal and window size dependent predictors from the macroblock level motion refinement, and replace them instead with predictors from the initial picture level estimator. One may also observe that unlike the original method the invention now also have information about motion from previously unavailable regions (i.e. blocks on the right and bottom from the current position) which can lead to a further efficiency improvement. In an extension, the RD joint distortion cost used during the final, macroblock level, motion estimation may now consider not only the motion cost of coding the current block's motion data but also the motion cost of all dependent blocks/macroblocks.

Further, H.264, apart from normal frame type coding, also supports two additional picture types, field frames and Macroblock Adaptive Field/Frame frames, to better handle interlace coding. In many implementations motion estimation is performed independently for every possible picture or macroblock interlace coding mode, therefore tremendously increasing complexity. To reduce complexity, the invention can perform motion estimation as described in reference to EPZS based coding above using field pictures and consider these field motion vectors as predictors for all types of pictures. The relationship also of top and bottom field motion vectors (i.e. motion vectors pointing to same parity fields in same reference and have equal value) can also allow us to determine with relatively high probability the coding mode of an MBAFF macroblock pair.

Following A. M. Tourapis, K. Suehring, and G. Sullivan, "H.264/MPEG-4 AVC Reference Software Enhancements," ISO/IEC JTC1/SC29/WG11 and ITU-T Q6/SG16, document JVT-N014, January 2005 (Tourapis/Suehring/Sullivan), the invention optionally includes several additional features to significantly improve coding efficiency. In other embodiments, a multi-pass encoding strategy is used to encode each frame while optimizing different parameters such as quantizers or weighted prediction modes. This procedure sometimes increases complexity, especially if motion estimation is performed at each pass. Alternatively, the system optionally reduces complexity by considering the motion information of the best previous coding mode, or by considering an initial Pre-Estimator as discussed above, and by only performing simple refinements when necessary using the EPZS patterns.

In this embodiment, decisions on refinements are based on the block's distortion using the current and previous best picture coding mode, while during predictor consideration, motion vectors from co-located or adjacent blocks on all directions may be considered. This could also be extended to subpixel refinement as well.

As was presented in the discussion of the EPZS based motion pre-estimator above, motion cost can be computed not only based on the current block but also on its impact to its dependent blocks/macroblocks (i.e. blocks on the right, bottom-left, bottom, and near the right-most image boundary the bottom right block). Under appropriate conditions these steps lead to similar or even better performance than what is presented in Tourapis/Suehring/Sullivan, cited above, at considerably lower computational complexity. More aggressive strategies (although with an increase in complexity), such as trellis optimization, can also be used to refine the motion field of each coding pass.

What is claimed is:

1. A non-transitory computer-readable medium for encoding a video, the non-transitory computer-readable medium comprising instructions that when executed cause a processor to:
receive a video comprising a plurality of video frames, each frame comprising a plurality of blocks;
estimate one or more best block-matching motion vectors of a block of a video frame of the plurality of video frames in a number of stages, the estimating comprising for each stage of the number of stages:
selecting a center position motion vector as a best matched motion vector by iteratively checking a set of test motion vectors based on a first rate-distortion optimization (RDO)-based metric, the set of test motion vectors expected to include highly reliable predictors based on at least one of a priori knowledge of a video including the video frame and a priori knowledge of a plurality of video sequences stored in a database, the set of test motion vectors comprising one or more of a zero-motion vector, a motion vector predictor (MVP), and one or more individual motion vectors from neighboring blocks adjacent to the block, the MVP being a median of a plurality of motion vectors for a plurality of neighboring blocks adjacent to the block; and iteratively applying one or more global matching criteria to the selected best matched motion vector to select a total best matched motion vector for the block, the iterative applying comprising:
   for each iteration of a plurality of iterations:
      determining whether a candidate total best matched motion vector for the iteration meets one or more first adaptive threshold criteria based on a second RDO-based metric; and
      responsive to the candidate total best matched motion vector meeting the first adaptive threshold criteria, selecting the candidate total best matched motion vector as the total best matched motion vector and terminating the iterative applying; and
   responsive to none of the candidate total best matched motion vectors meeting the first adaptive threshold criteria during the iterative applying, selecting a final candidate total best matched motion vector from a final iteration of the plurality of iterations as the total best matched motion vector;
encode the video frame as part of a compressed video stream, the encoded video frame including the selected total best matched motion vector for the block; and
perform at least one of: store the compressed video stream or transmit the compressed video stream.

2. The non-transitory computer-readable medium of claim 1, wherein each of the one or more global matching criteria is applied to the selected best matched motion vector using a pattern over a predefined search range around the selected best matched motion vector, the pattern being a combination of one or more of a diamond pattern, a square pattern, a circle pattern, a hexagon pattern, a cross pattern, or a multiple stage pattern having varying step sizes.

3. The non-transitory computer-readable medium of claim 1, wherein the instructions further cause the processor to:
   responsive to none of the candidate total best matched motion vectors meeting the first adaptive threshold criteria during the iterative applying, iteratively refine the search in the proximity of the total best matched motion vector to determine a best motion vector meeting the first adaptive threshold criteria, the iterative refining comprising:
      applying a pattern in the proximity of the total best matched motion vector, the pattern being a combination of one or more of a diamond pattern, a square pattern, a circle pattern, a hexagon pattern, a cross pattern, or a multiple stage pattern having varying step sizes; and
      updating the total best matched motion vector after each iteration until a total best matched motion vector meeting the first adaptive threshold is obtained.

4. The non-transitory computer-readable medium of claim 1, wherein the iterative checking comprises:
   for each iteration of a plurality of iterations:
      determining whether a candidate best matched motion vector for the iteration meets one or more second adaptive threshold criteria based on the first RDO-based metric; and
      responsive to the candidate best matched motion vector meeting the second adaptive threshold criteria, selecting the candidate best matched motion vector as the best matched motion vector for the block and terminating the iterative checking; and
   responsive to none of the candidate best matched motion vectors meeting the second adaptive threshold criteria during the iterative checking, selecting a final candidate best matched motion vector from a final iteration of the plurality of iterations as the best matched motion vector.

5. An apparatus for encoding a video, comprising:
   the non-transitory computer-readable medium of claim 1 as a first non-transitory computer-readable medium;
   a second non-transitory computer-readable medium storing the video; and
   the processor.

6. The apparatus of claim 5, wherein each of the one or more global matching criteria is applied to the selected best matched motion vector using a pattern over a predefined search range around the selected best matched motion vector, the pattern being a combination of one or more of a diamond pattern, a square pattern, a circle pattern, a hexagon pattern, a cross pattern, or a multiple stage pattern having varying step sizes.

7. The apparatus of claim 5, wherein the instructions of the first non-transitory computer-readable medium further cause the processor to:
   responsive to none of the candidate total best matched motion vectors meeting the adaptive threshold criteria during the iterative applying, iteratively refine the search in the proximity of the total best matched motion vector for a best motion vector in the refined search, the iterative refining comprising:
      applying a pattern in the proximity of the total best matched motion vector, the pattern being a combination of one or more of a diamond pattern, a square pattern, a circle pattern, a hexagon pattern, a cross pattern, or a multiple stage pattern having varying step sizes; and
      updating the total best matched motion vector after each iteration until a best motion vector is obtained based on an RDO metric.

8. A non-transitory computer-readable medium for encoding a video, the non-transitory computer-readable medium comprising instructions that when executed cause a processor to:
   receive a video comprising a plurality of video frames, each frame comprising a plurality of blocks;
   estimate one or more best block-matching motion vectors of a block of a video frame of the plurality of video frames in a number of stages by, for each stage of the number of stages:
      selecting a best matched motion vector by iteratively checking a set of test motion vectors from one or more reference frames based on a first RDO-based metric, the set of test motion vectors expected to include highly reliable predictors based on at least one of a priori knowledge of a video including the video frame and a priori knowledge of a plurality of video sequences stored in a database, the set of test predictor motion vectors comprising one or more of a zero-motion vector, a MVP, and one or more temporal predictors, the MVP being a median of a plurality of motion vectors for a plurality of neighboring blocks adjacent to the block, the one or more temporal predictors being from previously coded frames having a same location of the block; and
      iteratively apply one or more global matching criteria to the selected best matched motion vector to select a total best matched motion vector for the block, the iterative applying comprising:
         for each iteration:
            determining whether a candidate total best matched motion vector for the iteration meets one or more first adaptive threshold criteria based on a second RDO-based metric; and
            responsive to the candidate total best matched motion vector meeting the first adaptive threshold criteria, accepting the selected total best matched motion vector as the best matched motion vector for the block and terminating the iterative applying; and responsive to none of the candidate total best matched motion vectors meeting the first adaptive threshold criteria during the iterative applying, selecting a final candidate total best matched motion vector from a final iteration of the plurality of iterations as the total best matched motion vector;

encode the video frame as part of a compressed video stream, the encoded video frame including the selected total best matched motion vector for the block; and perform at least one of: store the compressed video stream or transmit the compressed video stream.

9. The non-transitory computer-readable medium of claim 8, wherein the iterative checking comprises:
for each iteration of a plurality of iterations:
determining whether a candidate best matched motion vector for the iteration meets one or more second adaptive threshold criteria based on the first RDO-based metric; and
responsive to the candidate best matched motion vector meeting the second adaptive threshold criteria, accepting the candidate best matched motion vector as the best matched motion vector for the block and terminating the iterative checking; and
responsive to none of the candidate best matched motion vectors meeting the second adaptive threshold criteria during the iterative checking, selecting a final candidate best matched motion vector from a final iteration of the plurality of iterations as the best matched motion vector.

10. The non-transitory computer-readable medium of claim 8, wherein the instructions further cause the processor to:
responsive to none of the candidate total best matched motion vectors meeting the first adaptive threshold criteria during the iterative applying, iteratively refining the search in the proximity of the total best matched motion vector to determine a best motion vector that meets the first adaptive threshold criteria.

11. The non-transitory computer-readable medium of claim 10, wherein the iterative refining comprises:
applying a pattern in the proximity of the total best matched motion vector, the pattern being a combination of one or more of a diamond pattern, a square pattern, a circle pattern, a hexagon pattern, a cross pattern, or a multiple stage pattern having varying step sizes; and
updating the total best matched motion vector after each iteration until a total best motion vector meeting the first adaptive threshold is obtained.

12. The non-transitory computer-readable medium of claim 10, wherein the instructions further cause the processor to:
responsive to not meeting the first adaptive threshold criteria during the iterative refining, select the total best matched motion vector obtained after the end of the iterations as an individual best motion vector.

13. The non-transitory computer-readable medium of claim 8, wherein each of the one or more global matching criteria is applied to the selected best matched predictor motion vector using a pattern over a predefined search range around the selected best matched motion vector, the pattern being a combination of one or more of a diamond pattern, a square pattern, a circle pattern, a hexagon pattern, a cross pattern, or a multiple stage pattern having varying step sizes.

14. The non-transitory computer-readable medium of claim 8, wherein at least one of the first and second RDO-based metrics is a lagrangian cost measurement.

15. The non-transitory computer-readable medium of claim 8, wherein at least one of the first and second RDO-based metric is a sum of absolute differences (SAD) between original pixels and corresponding encoded or decoded pixels of the block.

16. An apparatus for encoding a video, comprising:
the non-transitory computer-readable medium of claim 8 as a first non-transitory computer-readable medium;
a second non-transitory computer-readable medium storing the video; and
the processor.

17. The apparatus of claim 16, wherein each of the one or more global matching criteria is applied to the selected best matched predictor motion vector using a pattern over a predefined search range around the selected best matched motion vector, the pattern being a combination of one or more of a diamond pattern, a square pattern, a circle pattern, a hexagon pattern, a cross pattern, or a multiple stage pattern having varying step sizes.

18. The apparatus of claim 16, wherein the instructions of the first non-transitory computer-readable medium further cause the processor to:
responsive to none of the candidate total best matched predictor motion vectors meeting the first adaptive threshold criteria during the iterative applying, iteratively refine the search in the proximity of the total best matched motion vector for a best motion vector meeting the first adaptive threshold criteria, the iterative refining comprising:
applying a pattern in the proximity of the total best matched predictor motion vector, the pattern being a combination of one or more of a diamond pattern, a square pattern, a circle pattern, a hexagon pattern, a cross pattern, or a multiple stage pattern having varying step sizes.

19. The apparatus of claim 16, wherein at least one of the first and second RDO-based metrics is a lagrangian cost measurement.

20. The apparatus of claim 16, wherein at least one of the first and second RDO-based metric is a SAD between original pixels and corresponding encoded or decoded pixels of a given block.

21. A method for encoding a video, comprising:
receiving a video comprising a plurality of video frames, each frame comprising a plurality of blocks;
estimating one or more best block-matching motion vectors of a block of a video frame of the plurality of video frames in a number of stages, the estimating comprising for each stage of the number of stages:
selecting a center position motion vector as a best matched motion vector by iteratively checking a set of test motion vectors based on a first rate-distortion optimization (RDO)-based metric, the set of test motion vectors expected to include highly reliable predictors based on at least one of a priori knowledge of a video including the video frame and a priori knowledge of a plurality of video sequences stored in a database, the set of test motion vectors comprising one or more of a zero-motion vector, a motion vector predictor (MVP) being a median of a plurality of motion vectors for a plurality of neighboring blocks adjacent to the block, one or more individual motion vectors from neighboring blocks adjacent to the block, and one or more temporal predictors from previously coded frames having a same location of the block; and iteratively applying one or more global matching criteria to the selected best matched motion vector to select a total best matched motion vector for the block, the iterative applying comprising:
  for each iteration of a plurality of iterations:
    determining whether a candidate total best matched motion vector for the iteration meets one or more first adaptive threshold criteria based on a second RDO-based metric; and
    responsive to the candidate total best matched motion vector meeting the first adaptive threshold criteria, selecting the candidate total best matched motion vector as the total best matched motion vector and terminating the iterative applying;
encoding the video frame as part of a compressed video stream, the encoded video frame including the selected total best matched motion vector for the block; and
performing at least one of: store the compressed video stream or transmit the compressed video stream.

22. The method of claim 21, wherein each of the one or more global matching criteria is applied to the selected best matched motion vector using a pattern over a predefined search range around the selected best matched motion vector, the pattern being a combination of one or more of a diamond pattern, a square pattern, a circle pattern, a hexagon pattern, a cross pattern, or a multiple stage pattern having varying step sizes.

23. The method of claim 21, further comprising:
responsive to none of the candidate total best matched motion vectors meeting the first adaptive threshold criteria during the iterative applying, iteratively refine the search in the proximity of the total best matched motion vector to determine a best motion vector meeting the first adaptive threshold criteria, the iterative refining comprising:
  applying a pattern in the proximity of the total best matched motion vector, the pattern being a combination of one or more of a diamond pattern, a square pattern, a circle pattern, a hexagon pattern, a cross pattern, or a multiple stage pattern having varying step sizes; and
  updating the total best matched motion vector after each iteration until a total best matched motion vector meeting the first adaptive threshold is obtained.

24. The method of claim 21, wherein the iterative checking comprises:
for each iteration of a plurality of iterations:
  determining whether a candidate best matched motion vector for the iteration meets one or more second adaptive threshold criteria based on the first RDO-based metric; and
  responsive to the candidate best matched motion vector meeting the second adaptive threshold criteria, selecting the candidate best matched motion vector as the best matched motion vector for the block and terminating the iterative checking; and
responsive to none of the candidate best matched motion vectors meeting the second adaptive threshold criteria during the iterative checking, selecting a final candidate best matched motion vector from a final iteration of the plurality of iterations as the best matched motion vector.

* * * * *